June 5, 1973     R. E. DUNIPACE     3,737,501

METHOD OF FORMING PLASTIC TUBULAR ARTICLES

Original Filed April 22, 1968     6 Sheets-Sheet 1

INVENTOR.
RUSSELL E. DUNIPACE
BY Richard B. Dence
   E. J. Holler
ATTORNEYS

INVENTOR
RUSSELL E. DUNIPACE
BY Richard P. Dence
& E. J. Holler
ATTORNEYS

INVENTOR.
RUSSLL E. DUNIPACE
BY Richard B. Dence
E. J. Holler
ATTORNEYS

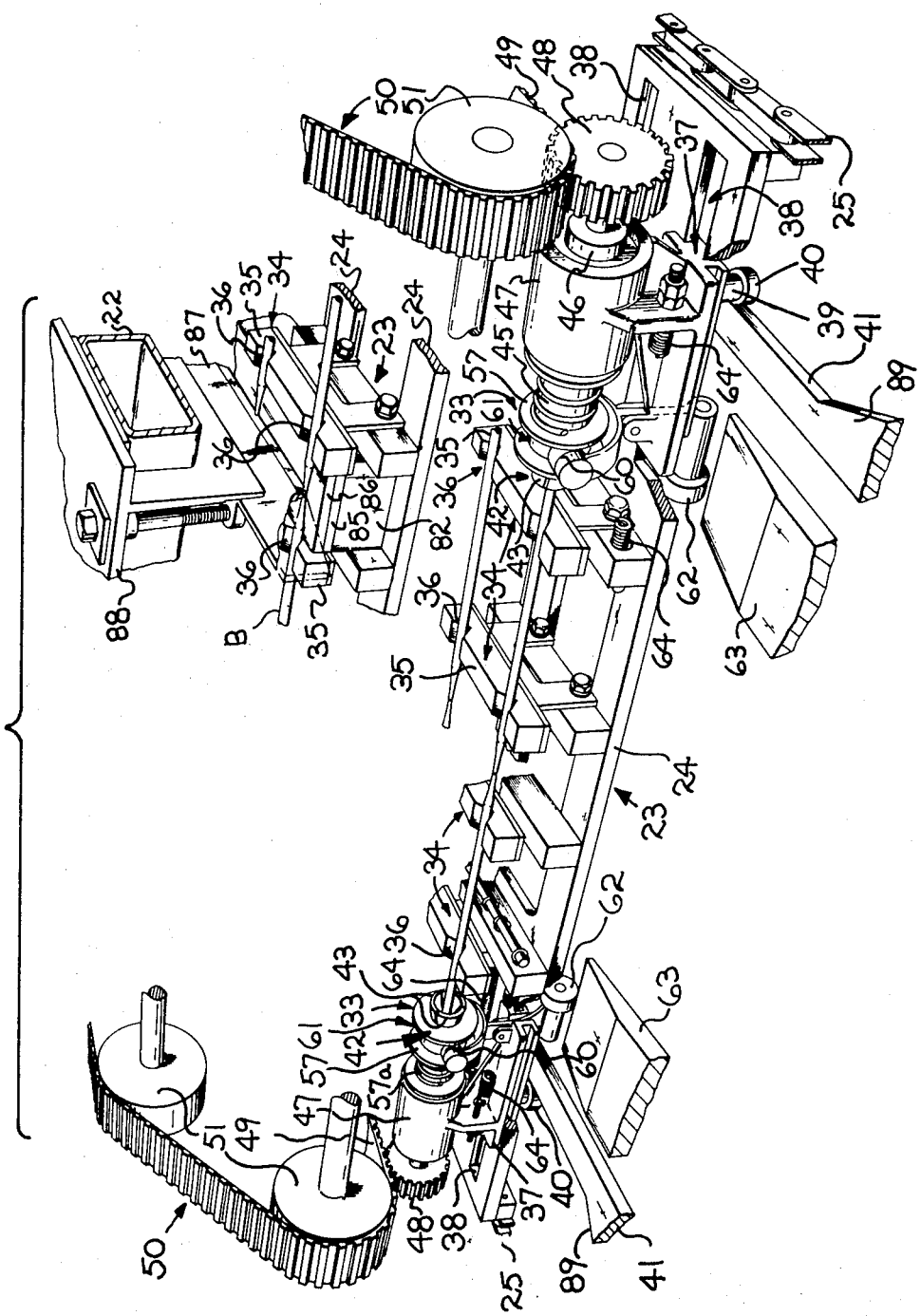

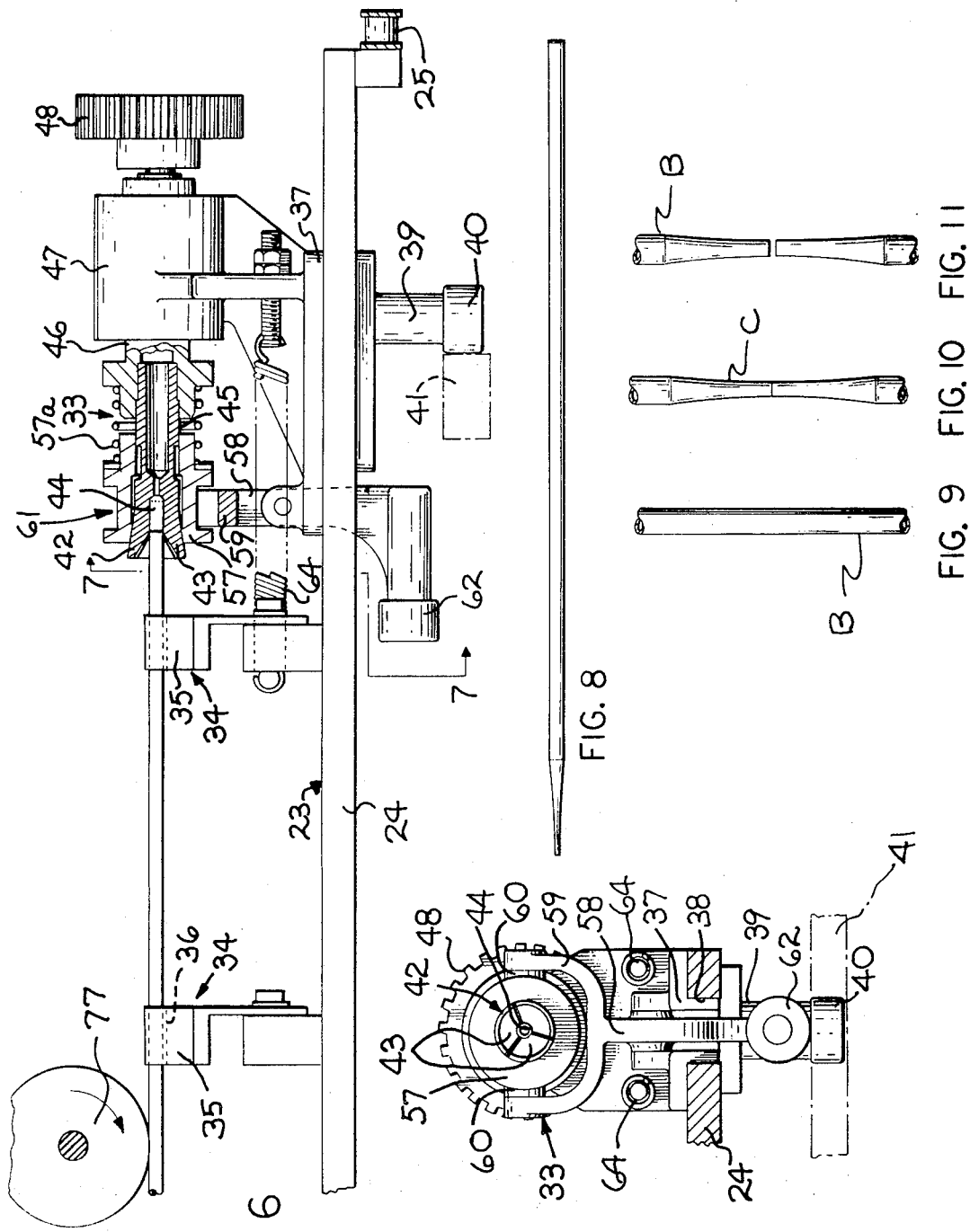

United States Patent Office 3,737,501
Patented June 5, 1973

3,737,501
METHOD OF FORMING PLASTIC TUBULAR ARTICLES
Russell E. Dunipace, Perrysburg, Ohio, assignor to Owens-Illinois, Inc., Toledo, Ohio
Original application Apr. 22, 1968, Ser. No. 723,351, now Patent No. 3,608,146. Divided and this application Oct. 20, 1970, Ser. No. 82,233
Int. Cl. B29c 17/02
U.S. Cl. 264—159                                4 Claims

ABSTRACT OF THE DISCLOSURE

The present invention relates to apparatus and method for conveying and transforming tubular thermoplastic blanks into tubular pipets, medicine droppers, burette points, ampuls, and the like, while advancing continuously along a prescribed path. The invention has particular utility in forming disposable pipets made of thermoplastic material such as polystyrene and the like.

This application is a division of my earlier filed copending application Ser. No. 723,351, now Pat. No. 3,608,146.

BACKGROUND OF THE INVENTION

This invention relates to apparatus and method for forming plastic pipets and similar items of scientific and laboratory ware from tubular blanks.

More particularly, this invention relates to apparatus and method for forming a pair of similar, if not identical, pipets from a single length or blank of thermoplastic tubing of uniform dimensions, by heating to a soft deformable state, a medial portion of the blank and elongating such heat-softened portion axially thereby to form a localized area of reduced cross-section, which area upon cooling is severed medially of its length to form a tapered delivery or discharge end on each of two similary-shaped pipets.

Heretofore, it has been conventional practice to form glass pipets from lengths of glass tubing during their conveyance in succession in transverse array in either horizontal or inclined planes by various types of conveyor apparatus. The tubular blanks are either continuously moved along a prescribed path through various forming stations or, alternatively, the conveyor for the blanks is periodically stopped to deliver the blanks, at indexed intervals, to prescribed working locations and devices. In the forming of essentially straight-sided elongated glass pipets, the blanks have been either moved continuously or intermittently through a series of working stations while resting upon the upper reach of the conveyor mechanism of the forming machine. The inherent rigidity of glass blanks permits their being worked while simply resting upon the upper reach of the conveyor means, thereby to form a pair of similar pipets from a single tubular glass blank. A medial region of the glass blanks may be heat-softened and stretched by contacting the sides of the blanks, the medial region of reduced cross-section then being separated by a scoring and/or thermal shocking operation. Apparatus which has previously been employed in manufacturing pipets having constant volume bulbs is disclosed and claimed in U.S. Pat. No. 3,309,188 issued Mar. 18, 1967. Also, various other apparatus for performing work on glass tubes and vials is disclosed in U.S. Pats. Nos. 3,170,782, 3,257,186 and 2,878,619, all of which are assigned to the same parent assignee as the present application.

It must be recognized that due to the inherent rigidity of tubular glass blanks, work thereon may efficiently be conducted by simply contacting the sides of the workpieces to rotate the same while passing through a series of forming stations.

The problems inherent in producing a pair of disposable plastic pipets from a single length of plastic tubing are considerably different from those experienced in glass working. It is extremely important that precise uniformity in the produced pipets be achieved to ensure a high quality product. The tendency of such plastic tubing blanks to bow out of axial alignment when subjected to various forming operations is a serious problem requiring positive retention of the workpiece. It is common practice in the use of such pipets to employ the same for a single-type or standardized operation, or analysis, and then dispose of same. This is particularly true in the use of such pipets in pathological laboratories, the "one-use" pipets being disposable to eliminate the practice of washing and autoclaving to re-establish their sterility. The precision of such end-use application requires that the pipets be precisely alike in size and dimensions, and have comparable fluid delivery times, thus requiring accurate control of the formation of their delivery tips. Thus, the tubular blanks of thermoplastic material such as polystyrene, polyethylene, polypropylene, and the like, from which pipets may be economically made, are not normally sufficiently rigid to permit precision forming while resting on a conveyor upper reach. It is to overcome the inherent deficiencies in forming such materials that the present invention is directed.

SUMMARY OF THE INVENTION

Accoridngly, it is an object of the present invention to provide novel apparatus adapted to continuously convey a series of plastic tubular blanks through a series of forming stations, the tubes being firmly constrained at their ends and positively rotated during a major segment of the forming operation.

Another object of the present invention is to provide apparatus for continuously conveying a series of tubular blanks of synthetic thermoplastic material along a lineal path with axes of the blanks disposed normal to their path of travel and in recumbent position, while positively retaining and axially rotating the blanks throughout their transport through a series of forming stations.

Another object of this invention is to provide apparatus and method for forming similarly-shaped plastic pipets having precisely-contoured delivery tips, a pair of articles being made from a single tube-like blank, while transporting the blank through heat-softetning, stretching and severing stations to form pipets having matched delivery tips and overall lengths.

A further object of this invention is to provide a novel method for forming pairs of pipets from tubular plastic blanks which are retained at their ends, axially rotated, medially heat-softened, stretched and separated as they are continuously and sequentially processed.

A still further object of this invention is the provision of a novel method of forming precisely-contoured pairs of disposable plastic pipets from tubular blanks whereby the blank is medially heat-softened and longitudinally pulled by end-grasping devices to form a restricted region which, upon cooling, is subsequently separated by shearing.

Other objects will be in part apparent and in part pointed out hereinafter.

BRIEF DESCRIPTION OF THE DRAWINGS

In the accompanying drawings forming a part of this application.

Figure 1:
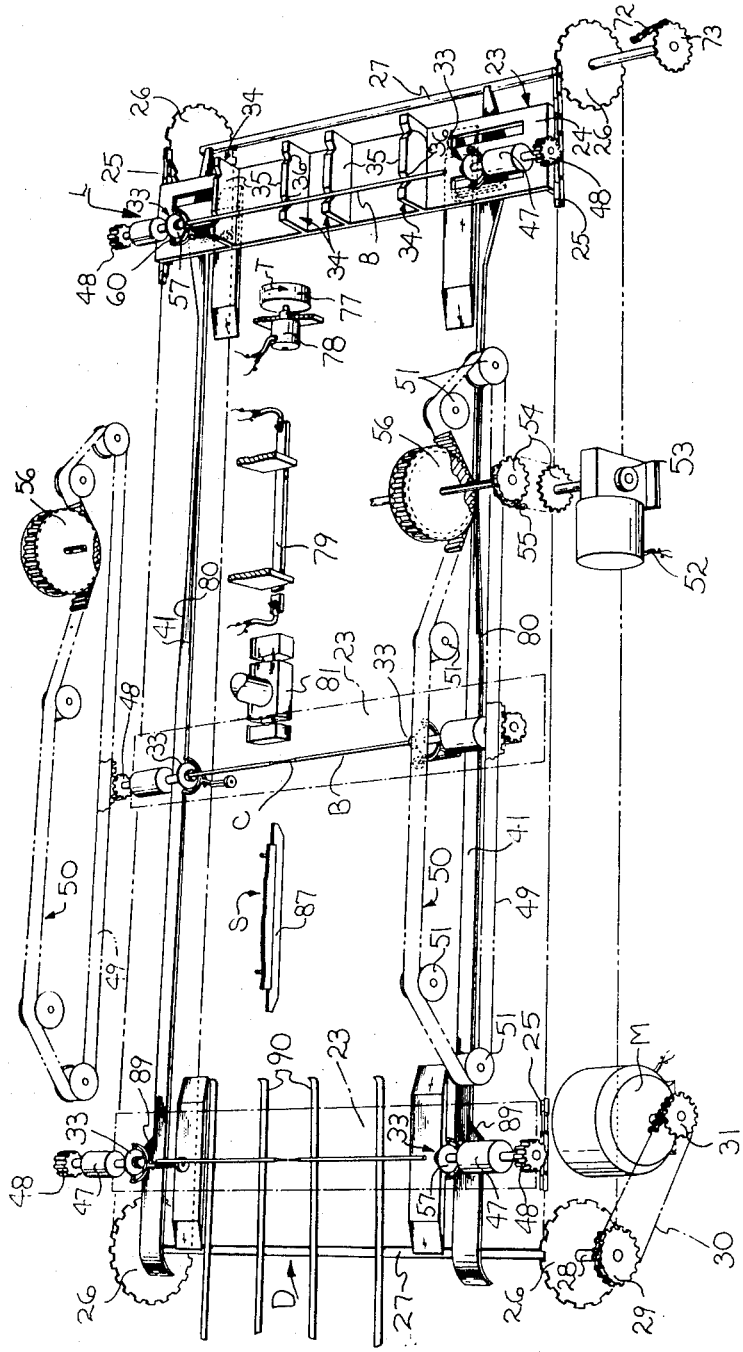
FIG. 1 is a schematic prespective view showing the general relationship of the basic elements of the apparatus, portions being omitted in the interest of clarity.

FIG. is a side elevational view with parts in section.

contractable jaws 43 shaped to create a blank-end receiving recess 44 has a rearward axial extension 45 carried by and coaxial with a stub-shaft 46 journaled in a bearing 47 which is mounted upon the slide 37. A driven pinion

Figure 2:
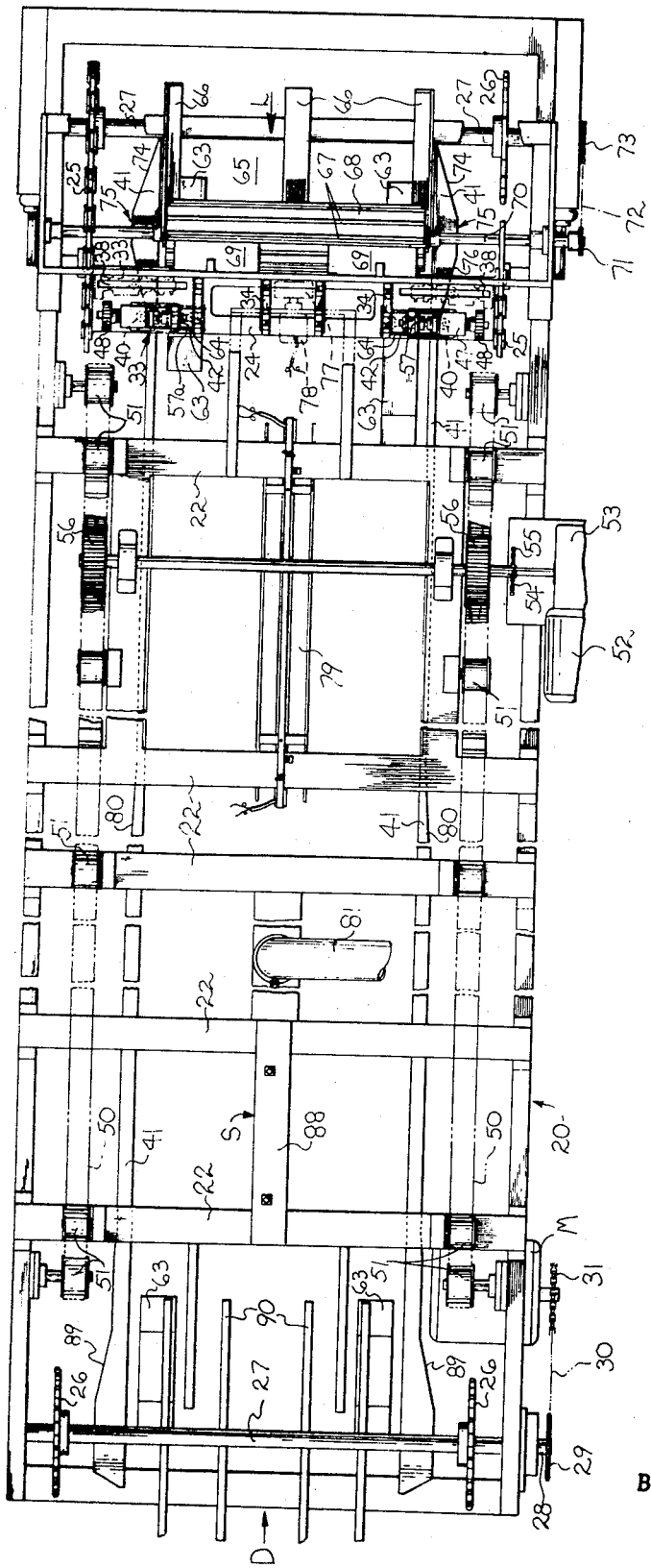
FIG. 2 is a top plan view of the apparatus, again with portions of some elements omitted in the interest of clarity.

lower cam 63 terminates, allowing the adjacent chuck socket to grasp the adjacent end of the blank and concurrently therewith, the pinion 48 of this lower chuck meshes with and is rotated by a second toothed drive belt 50. With both ends of the blank thus firmly chucked and rotating on the common axis of the blank and chucks, they advance with the carrier plate 24 so as to move the medial portion of the blank beneath and quite close to a ribbon-type electric heater 79 (FIGS. 1 and 2) which softens the plastic material in this portion to such degree that it can be stretched and reduced diametrically to create a double taper (FIGS. 1, 10 and 11) incident to moving apart axially of the two chucks 33 by the cam slope 80 of cams 41.

Figure 3:
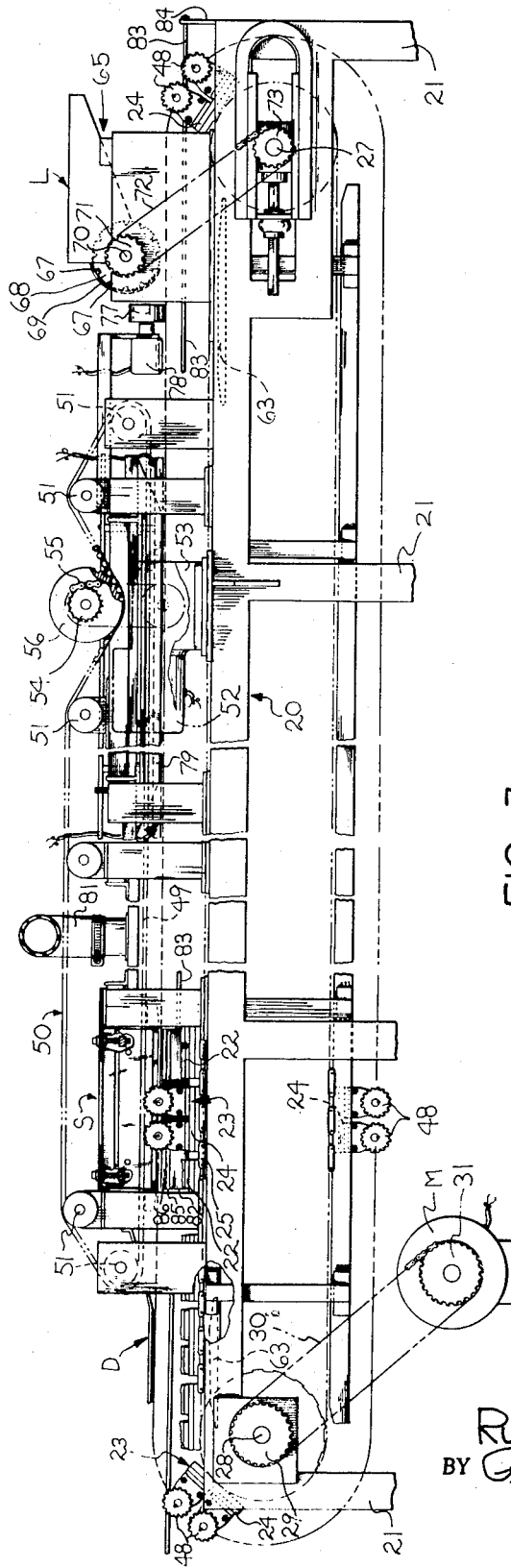
Figure 4:
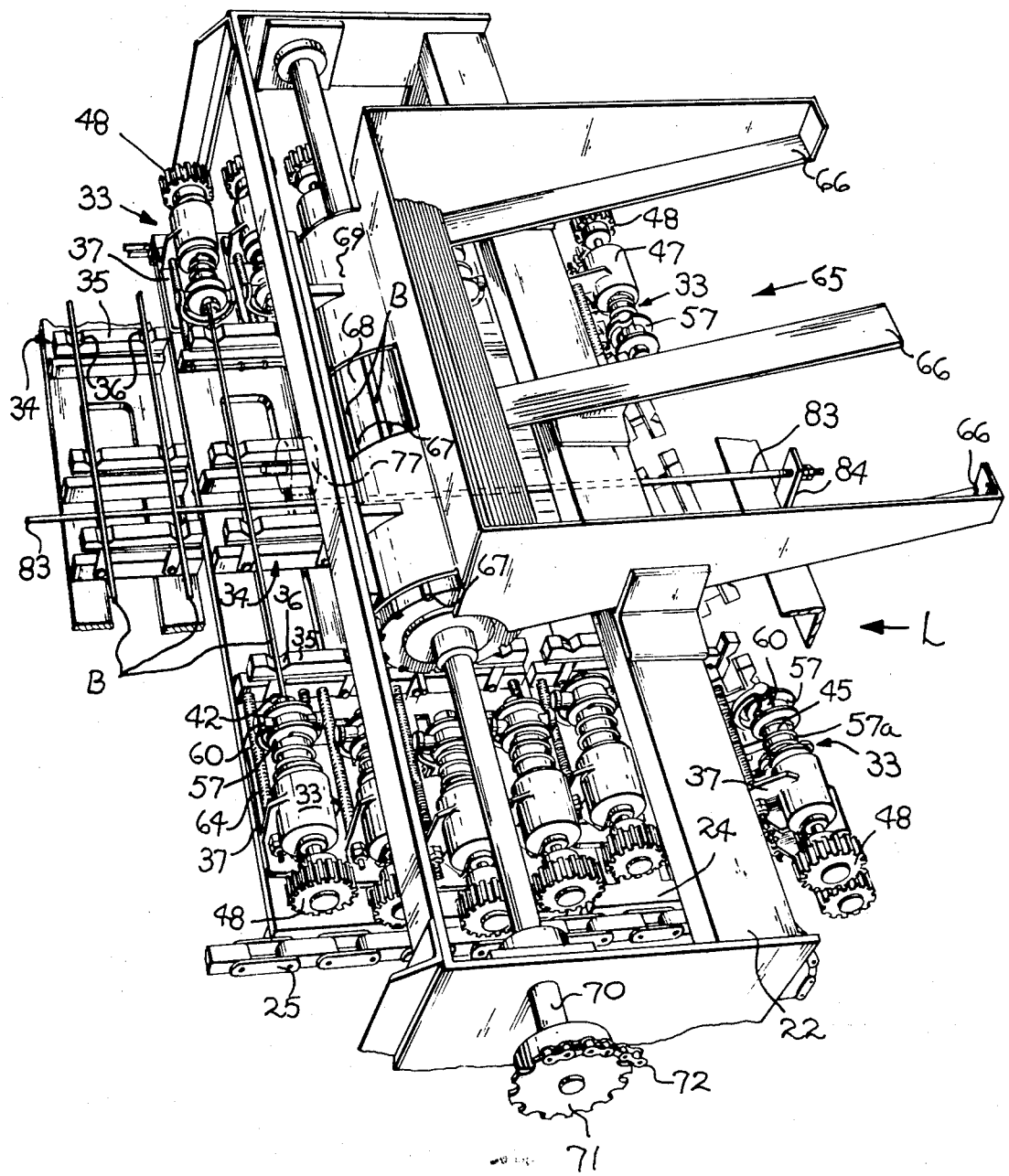

Between this blank stretching zone and a blank scoring zone S, the constricted medial portion may cool naturally in the open atmosphere, of if preferred, cooling may be accelerated by cooling means 81. In the scoring zone S (FIGS. 1, 3 and 5), the coring mechanism comprises a floating anvil 82, or base, resting upon a pair of the cross-bars 22 and connected to one end of a horizontal rod 83 (FIGS. 3 and 4) which extends to the loading end L of the apparatus where it is anchored to a bracket 84. A facing comprising a strip 85 of polyurethane foam, to create a cushion, and a top strip 86 of Teflon, is mounted upon the base 82. The polyurethane foam strip 85 and the Teflon top strip 86 cooperate to provide a resilient support for jutxaposed surfaces of the blank adjacent the localized reduced diameter area of each blank during the precision scoring operation. A scoring blade 87 extends lengthwise of the apparatus, just above the anvil 82, such blade being suspended from a holder 88 which is capable of adjustment along a pair of the cross-bars 22 in order to change the precise point of scoring the constricted area of the blank as determined by the transverse location of the chucks 33 which first grasp an end of the blanks. Thus, it is seen that the bottom end of the socket recesses 44 of these particular chucks (those at the left side of FIG. 5, for example) constitute a reference point for the scoring blade setting. This blade may have at least its inlet end inclined to facilitate entry of blanks into the scoring zone S.

Upon completion of the scoring operation, the blank advances toward the discharge station D and during such advance, the chucks 33 are moved apart axially by the offset 89 of the cam 41. Thus, the blank is pulled axially to separate it into two separate completed pipets. Thereupon the chucks are opened by means of the cams 63, releasing the pipets so they may roll down tracks 90, or be removed in any other preferred manner.

Returning to the initial chucking of the blanks B, it should be explained that the upper cam 41 (FIG. 2) which determines the axial position of the adjacent chuck 33 functions immediately following chucking of both ends of the blank B, to move the first closed chuck so as to place the blank under slight axial tension. Thus the blank is held axially straight against any possible bowing and/or whipping action incident to rotation with the chucks. Plastic tubes have such tendency in varying degrees as determined by wall thickness and/or composition.

Modifications may be resorted to within the spirit and scope of the appended claims.

What is claimed:

1. The method of forming pairs of pipets simultaneously from tubular blanks of thermoplastic material comprising the steps of
    (1) conveying the tubular blanks in succession and in transverse recumbent position along a substantially horizontal path,
    (2) sequentially grasping and retaining the end portions of each tubular blank in precise axial alignment normal to its direction of travel,
    (3) rotating each tubular blank about its longitudinal axis during a major segment of its conveyance,
    (4) heating a localized medial portion of each blank into heat-softened deformable condition during its rotation and conveyance,
    (4a) supporting said blank intermediate of and in axial alignment with said end portions during said major segment of its conveyance,
    (4b) applying an axial tensile load to said blanks during the conveyance and heating and prior to the stretching thereof,
    (5) controllably axially stretching the heat-softened medial region of said blank to form a localized area tapering from each end to a reduced cross-section, and
    (6) severing the blank by scoring the localized area of reduced cross-section to form tapered delivery end portions of a pair of pipets.

2. The method in accordance with claim 1, including the steps of
    allowing the stretched localized area of reduced cross-section of said blank to cool prior to being severed by scoring, and
    supporting juxtaposed surfaces adjacent the localized reduced area of each said blank during said scoring.

3. The method in accordance with claim 1, wherein the step of heating said localized medial portion comprises heating-softening the localized medial area of each said blank by passing said blanks adjacent to an electrical-resistance-type strip heater during its conveyance perpendicularly thereto.

4. The method in accordance with claim 1, including the steps of
    initially retaining one end portion of each tubular blank in a first chucking mechanism, and
    secondarily retaining the other end portion of said blank in a second chucking mechanism in sequential order.

References Cited

UNITED STATES PATENTS

| | | | |
|---|---|---|---|
| 2,199,332 | 4/1940 | Dichter | 65—108 |
| 3,249,414 | 5/1966 | Hamilton | 65—109 |
| 2,272,105 | 2/1942 | Anastor | 65—108 X |
| 3,207,590 | 9/1965 | Corbeek | 65—109 X |
| 2,790,994 | 5/1957 | Cardot et al. | 264—159 X |
| 2,601,744 | 7/1952 | Everett | 65—109 |

FOREIGN PATENTS

| | | | |
|---|---|---|---|
| 505,744 | 5/1939 | Great Britain | 65—108 |

ROBERT F. WHITE, Primary Examiner

A. M. SOKAL, Assistant Examiner

U.S. Cl. X.R.

264—164

UNITED STATES PATENT AND TRADEMARK OFFICE
CERTIFICATE OF CORRECTION

PATENT NO. : 3,737,501
DATED : June 5, 1973
INVENTOR(S) : R. E. Dunipace

It is certified that error appears in the above-identified patent and that said Letters Patent are hereby corrected as shown below:

Col. 2, line 49, change "softetning" to --softening--;

Col. 3, line 4, after "FIG." insert --3--; Col. 3, line 34, change "transvesely to --transversely--; Col. 5, line 28, change "jutxaposed" to --juxtaposed--; Col. 6, line 36, change "heating-softening" to --heat-softening--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*